(12) United States Patent
Rigollet et al.

(10) Patent No.: US 9,273,706 B2
(45) Date of Patent: Mar. 1, 2016

(54) HINGED CLAMPING COLLAR

(75) Inventors: Nicolas Rigollet, Romorantin (FR); Fabrice Prevot, Selles sur Cher (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 95 days.

(21) Appl. No.: 13/883,337

(22) PCT Filed: Oct. 28, 2011

(86) PCT No.: PCT/FR2011/052538
§ 371 (c)(1),
(2), (4) Date: May 3, 2013

(87) PCT Pub. No.: WO2012/059675
PCT Pub. Date: May 10, 2012

(65) Prior Publication Data
US 2013/0212842 A1    Aug. 22, 2013

(30) Foreign Application Priority Data

Nov. 5, 2010  (FR) ...................................... 10 59150

(51) Int. Cl.
*F16B 2/08*  (2006.01)
*F16L 23/08*  (2006.01)

(52) U.S. Cl.
CPC . *F16B 2/08* (2013.01); *F16L 23/08* (2013.01); *Y10T 24/44051* (2015.01)

(58) Field of Classification Search
CPC ........... F16L 17/04; F16L 23/08; F16L 23/10; F16L 21/022; F16L 21/06; F16L 21/065; F16L 23/06; F16L 17/10; F16L 19/00; F16L 21/08; F16L 23/18; F16L 27/1012; F16L 21/005; F16L 3/1025; B23P 11/00; F16B 2/065; F16B 2/10; A61B 17/326; B62J 11/00; B62J 17/04; B62J 1/28; B62J 9/00
USPC .................................... 24/270, 271, 273, 461
See application file for complete search history.

(56) References Cited

U.S. PATENT DOCUMENTS

| 875,019 | A |   | 12/1907 | Wahlert |
|---|---|---|---|---|
| 3,233,907 | A | * | 2/1966 | Stanton .......................... 277/616 |
| 3,486,772 | A | * | 12/1969 | Elsner .............................. 285/96 |
| 3,828,403 | A | * | 8/1974 | Perrin et al. ..................... 24/270 |
| 3,964,773 | A | * | 6/1976 | Stade et al. ................... 285/367 |
| 3,999,825 | A | * | 12/1976 | Cannon .......................... 439/192 |
| 4,109,350 | A |   | 8/1978 | Acre |
| 4,272,871 | A | * | 6/1981 | Weinhold ........................ 24/270 |

(Continued)

FOREIGN PATENT DOCUMENTS

| FR | 2756356 A1 | 5/1998 |
|---|---|---|
| FR | 2775753 A1 | 9/1999 |

(Continued)

*Primary Examiner* — Robert J Sandy
*Assistant Examiner* — David Upchurch
(74) *Attorney, Agent, or Firm* — The Webb Law Firm

(57) ABSTRACT

Disclosed is a clamping collar which includes a belt made up of two belt portions, each of which has a first end provided with a tightening tab and a second end provided with an assembly member. The assembly members are suitable for co-operating to assemble the second ends together in a releasable manner. The collar also includes tightening means suitable for co-operating with the tightening tabs so as to move the tabs relative to each other once the second ends are assembled together, in such a manner as to tighten the collar.

22 Claims, 8 Drawing Sheets

(56) References Cited

U.S. PATENT DOCUMENTS

| | | | | |
|---|---|---|---|---|
| 4,408,788 | A * | 10/1983 | Beukema | 285/419 |
| 4,643,460 | A * | 2/1987 | Lieberg | 285/112 |
| 5,018,768 | A * | 5/1991 | Palatchy | 285/24 |
| 5,560,656 | A * | 10/1996 | Okamura et al. | 285/55 |
| 6,533,333 | B1 * | 3/2003 | Radzik | 285/367 |
| 2002/0109355 | A1 * | 8/2002 | Elliott | 285/410 |
| 2003/0062718 | A1 * | 4/2003 | Radzik | 285/94 |
| 2003/0122377 | A1 * | 7/2003 | Northrop et al. | 285/363 |
| 2004/0046387 | A1 * | 3/2004 | Niven et al. | 285/320 |
| 2005/0061927 | A1 | 3/2005 | Schaty | |
| 2005/0121911 | A1 * | 6/2005 | Ryhman et al. | 285/363 |
| 2005/0253380 | A1 | 11/2005 | Gibb et al. | |
| 2006/0284420 | A1 * | 12/2006 | Dole | 285/367 |
| 2008/0197627 | A1 * | 8/2008 | Baudoin et al. | 285/330 |
| 2010/0223764 | A1 | 9/2010 | Prevot et al. | |
| 2010/0314864 | A1 * | 12/2010 | Lemke et al. | 285/148.28 |
| 2012/0205909 | A1 * | 8/2012 | Bird | 285/337 |

FOREIGN PATENT DOCUMENTS

| | | |
|---|---|---|
| FR | 2902175 A1 | 12/2007 |
| GB | 2446813 A | 8/2008 |
| JP | 05-038408 | 5/1993 |
| JP | 2005-509118 A | 4/2005 |
| WO | 9843010 A1 | 10/1998 |
| WO | 2009155640 A1 | 12/2009 |

* cited by examiner

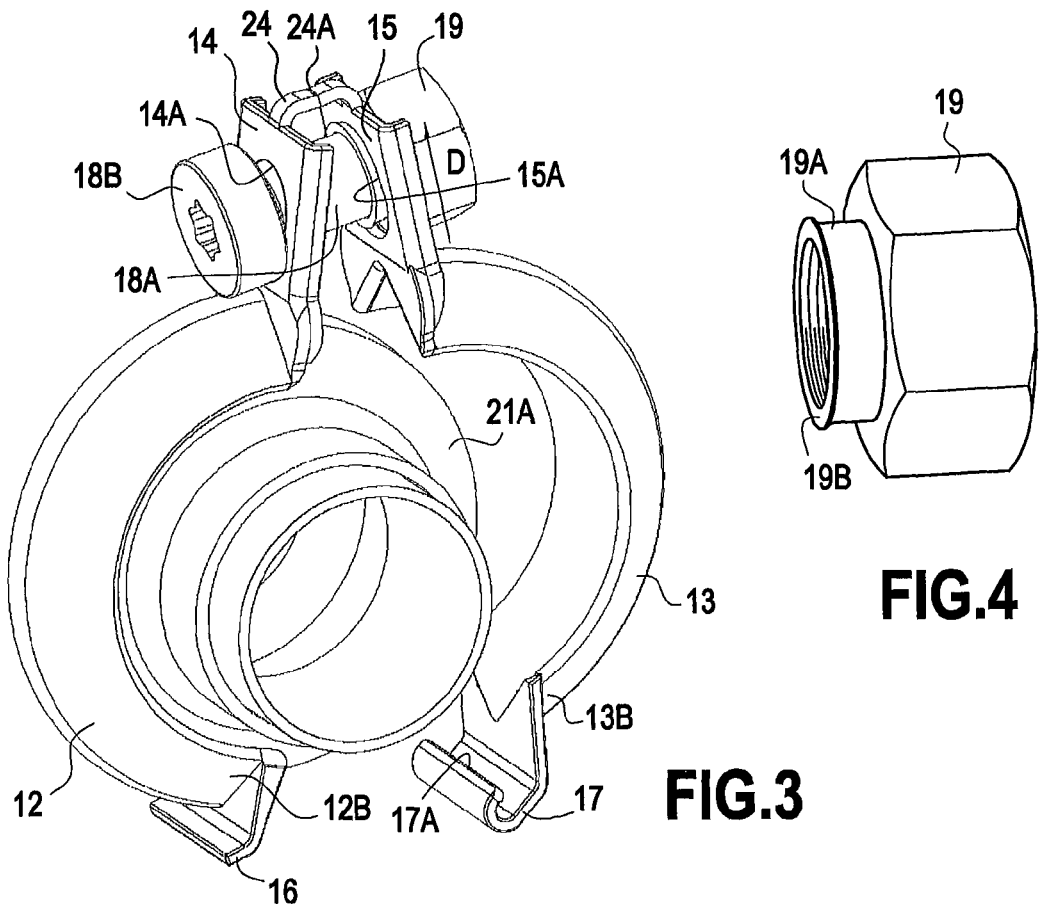
FIG.3
FIG.4
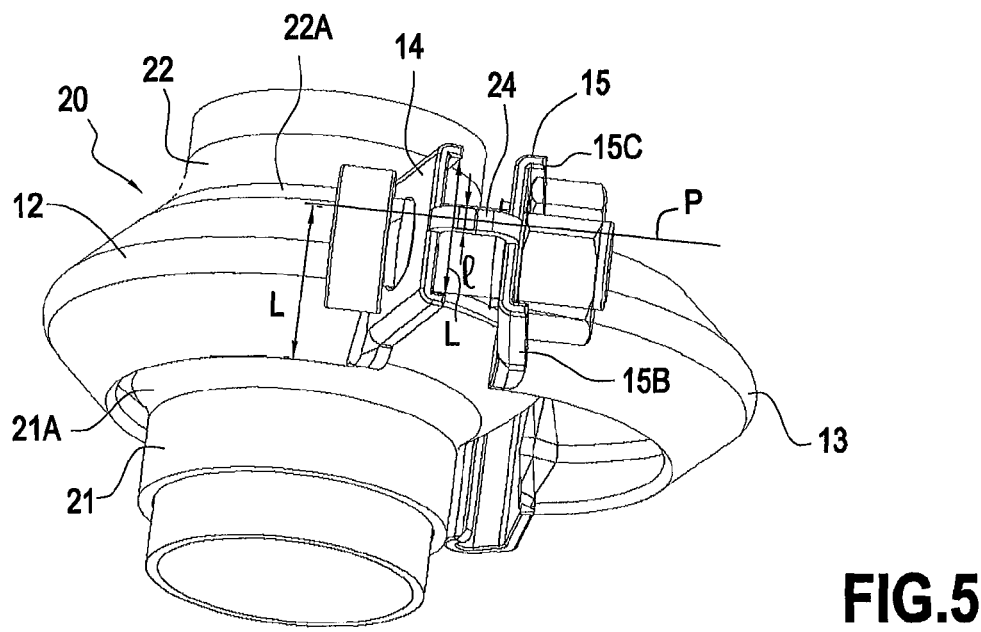
FIG.5

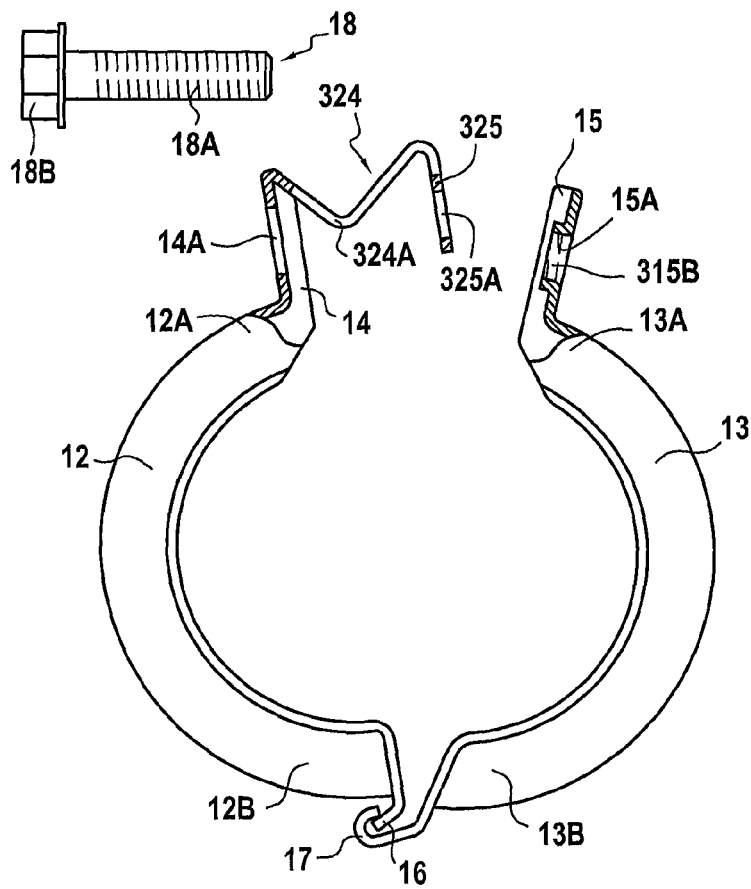
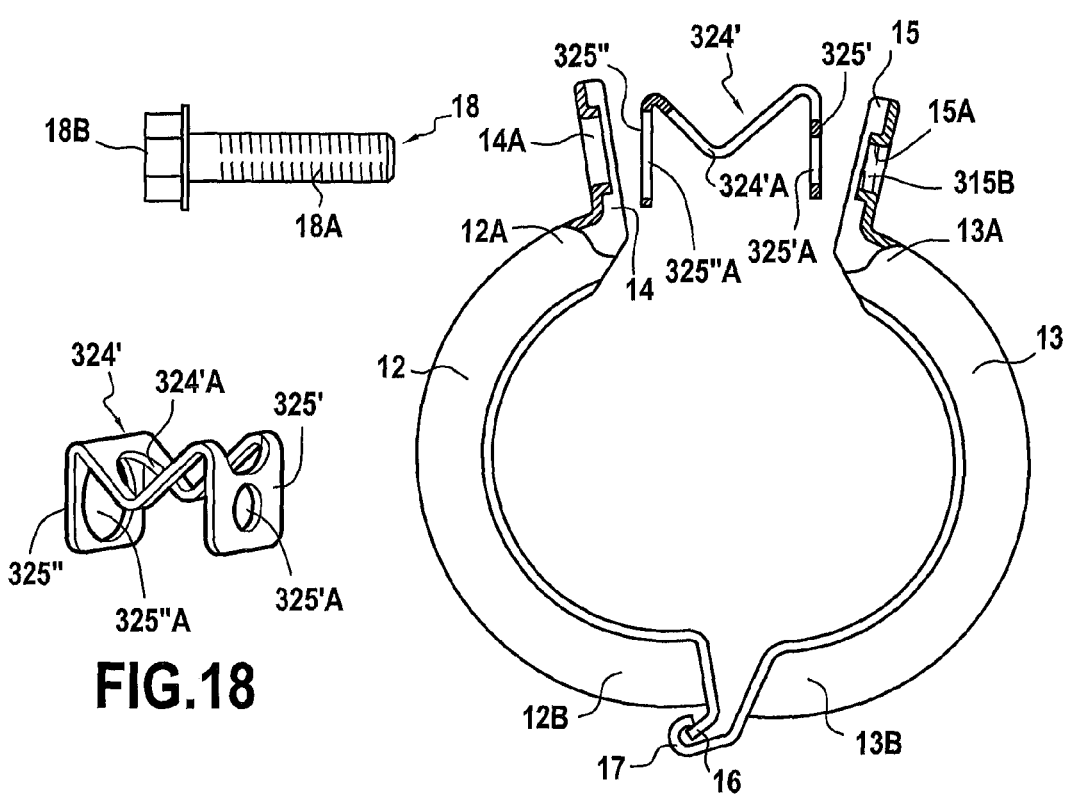

HINGED CLAMPING COLLAR

BACKGROUND OF THE INVENTION

Field of the Invention

The invention relates to a clamping collar comprising a belt made up of two belt portions, each of which has a first end provided with a tightening tab and a second end provided with an assembly member, the assembly members being suitable for co-operating with each other to assemble said second ends together in releasable manner, the collar further comprising tightening means suitable for co-operating with the tightening tabs so as to move the tabs relative to each other once the second ends are assembled together, in such a manner as to tighten the collar.

A collar of this type is known from Document WO 98/43010. In that known collar, the tightening means comprise a bolt having its shank passing through holes in tightening tabs. The belt is made up of two half-belts, each of which extends between a tightening tab and an assembly member. The bolt is pre-mounted on the tightening tabs, and is a loose fit relative thereto, so as to allow sufficient clearance for the two half belts to move. In order to mount the collar around the article that is to be clamped, the half-belts are spaced apart while the bolt is in place, they are disposed around the article, and they are closed one on the other by the assembly means that equip the respective second ends of the half-belts.

That collar is satisfactory in that, in order to mount it around the article to be clamped, it is not necessary to remove the tightening means. However, in order to cause the assembly members to co-operate with each other, the second ends of the half-belts must be positioned correctly relative to each other, which is a difficult operation. The relative movements of the two half-belts are not controlled, so that it is sometimes difficult to position them correctly relative to each other. In addition, the tightening means must remain accessible once the collar has been mounted, and are thus, in general, on the side that is visible to the operator, whereas the assembly members that equip the second belt ends are, in general, not visible or hardly visible, and are difficult to access.

U.S. Pat. No. 875,019 discloses a clamping collar in which the second ends of the belt portions can be assembled together by hooking. The first ends of the belt portions co-operate together, firstly via bolt-operated tightening means, and secondly via racks of serrations. For mounting that collar, firstly the second ends are hooked together, and then the first ends are brought closer together and the racks that they carry engage with each other to prevent the collar from opening under the effect of the reaction force exerted by the article that it surrounds. Finally, the tightening bolt is put in place and tightened.

Unlike the collar of WO 98/43010, that collar cannot be mounted around the article to be clamped while the tightening bolt is in place.

SUMMARY OF THE INVENTION

An object of the present invention is to improve the above-mentioned state of the art by proposing a collar that makes it possible, while the tightening means are in place on the tightening tabs, to mount the collar easily on an article to be clamped, while facilitating assembling together the second ends of the belt portions by means of the assembly members that equip them.

This object is achieved by the fact that the first ends of the two belt portions are interconnected via a bridge that, when the collar is in the free, non-tightened state, holds the tightening tabs relative to each other and makes it possible for the second ends of the belt portions to be brought closer together until the assembly members co-operate with each other, once the tightening means are in place relative to the tightening tabs, the configuration of said bridge being modified while the collar is being tightened so as to enable the tightening tabs to move relative to each other.

By means of the bridge, the tightening tabs are initially held in a determined position, corresponding to the collar being in the free, non-tightened state. The bridge also makes it possible to hold the two portions of belt relative to each other. During tightening, the configuration of the bridge is modified (in particular, the bridge deforms and/or breaks), so that the bridge does not hinder the tightening. When the collar is in the non-tightened state, the second ends of the two belt portions can be brought closer together until the assembly members are caused to co-operate with each other. During these movements of the belt portions, said belt portions are held relative to each other by the bridge. Thus, by means of the bridge, these movements can be controlled, i.e. the relative movements of the belt portions take place along paths determined by the bridge. The bridge thus forms a hinge between the two belt portions that prevents them from moving relative to each other in undesired directions. In particular, the two belt portions can, while moving relative to each other, remain in the overall plane of the collar, i.e. the assembly members that equip their second ends remain in register with each other, without being offset in the axial direction of the collar, in such a manner as to come to co-operate naturally at the end of the movement stroke. In other words, the two belt portions behave like jaws, the path of which is controlled by means of the presence of the bridge.

Thus, even though the tightening means remain in place relative to the tightening tabs, the second ends of the belt portions can be assembled together naturally and without any difficulty, the belt portions being hinged relative to each other in the region of the bridge.

Advantageously, the bridge is secured to or integral with the first end of at least one of the two belt portions. It may indeed be secured to or integral with the first end of each of the two belt portions.

Thus, the assembly made up of the two belt portions, their tightening tabs, and the bridge may be manipulated as a single unit.

Advantageously, the two belt portions and the bridge are formed in one piece.

The belt is thus formed in one piece, with the belt portions and the bridge, thereby reducing the number of parts that need to be manipulated in order to assemble all of the various component elements of the collar together, in order to mount the collar around an article that is to be clamped.

Advantageously, the bridge is secured to or integral with the first end of at least one of the belt portions via the tightening means.

Thus, putting in place the tightening means connects the bridge to the belt, without any additional assembly step.

Advantageously, the bridge extends between the tightening tabs.

Thus, the bridge extends in the region of the collar in which the tightening means are situated. It is therefore in the region of these means that the hinge is situated between the two jaws that form the two belt portions. The second ends equipped with the assembly means thereby have a large amount of angular clearance through which they can move relative to each other, without it being necessary for the bridge itself to have large dimensions. Any wastage of material is thus avoided.

Advantageously, the bridge is formed by at least one strip portion that is narrower than the belt portions.

Such a strip portion can easily be formed in one piece with the two belt portions. In any event, due to its narrowness, this portion can easily have its configuration modified while the collar is being mounted around the article that is to be clamped, and while the second ends of the belt portions are being moved closer together. In other words, the presence of the bridge does not significantly increase the forces necessary for bringing the second ends of the belt portions closer together.

Advantageously, the assembly members co-operate with each other by hooking.

Hooking constitutes a simple system for assembling together the assembly members that equip the second ends of the belt portions. With this shaping, the assembly members can be formed easily and at lower cost. Each assembly member can be formed in one piece with the belt portion that it equips, and assembling them together by hooking is easy.

Advantageously, the assembly member of the second end of one of the belt portions comprises a first lug projecting radially outwards and having a free end curved back inwards to form a hook, while the assembly member of the second end of the other belt portion comprises a second lug projecting radially outwards and that is suitable for co-operating with said hook.

The configuration of the assembly members is then simple, and they are easy to manufacture.

Advantageously, the assembly member of the second end of one of the belt portions is formed on an extension of said second end that is offset radially outwards.

The extension then advantageously has a hooking inside edge, and the assembly member of the second end of the other belt portion comprises a hooking edge suitable for hooking onto the hooking inside edge, on the inside of the extension.

This constitutes a variant that is advantageous and simple to manufacture for the assembly members.

BRIEF DESCRIPTION OF THE DRAWINGS

The invention can be well understood and its advantages appear more clearly on reading the following detailed description of embodiments shown by way of non-limiting example. The description refers to the accompanying drawings, in which:

FIG. 3 is a perspective view showing the same situation as in FIG. 2;

FIG. 4 shows the nut that is part of the tightening means of the collar of the preceding figures;

FIG. 5 is a view from above, seen looking along arrow V of FIG. 2;

FIGS. 16 and 17 show two variants of the component elements of the collar, before they are assembled; and FIG. 18 is a perspective view showing the bridge of the collar of FIG. 17.

DETAILED DESCRIPTION OF THE INVENTION

Figure 1:
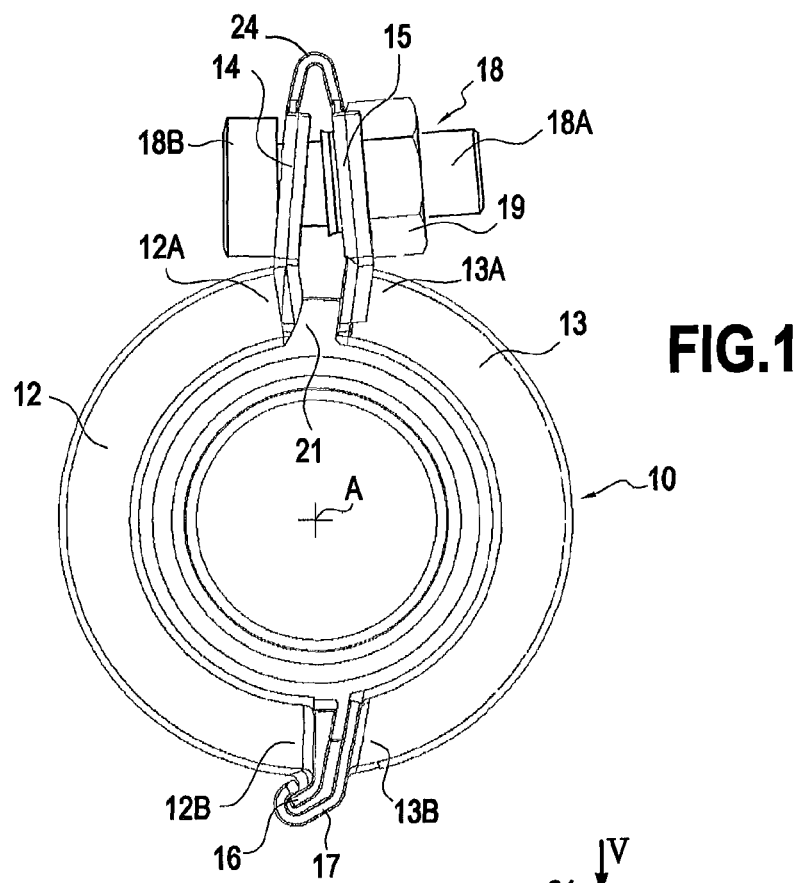
FIG. 1 shows a side elevation view of a clamping collar of the invention, while it is clamping an article.

Reference is made firstly to the collar of FIGS. 1 to 5. The collar comprises a belt 10 having two belt portions, respectively 12 and 13. Each of the first ends, respectively 12A or 13A of these belt portions carries a tightening tab, respectively 14 or 15. Each of the second ends, respectively 12B or 13B of these belt portions carries an assembly member, respectively 16 or 17. The collar is provided with tightening means that co-operate with the tightening tabs 14 and 15 to move them relative to each other in such a manner as to tighten the collar. In this example, the tightening means comprise a nut/bolt arrangement made up of a bolt 18 and a nut 19, wherein the bolt 18 has a shank 18A which passes through the holes, respectively 14A and 15A in the tightening tabs 14 and 15. The head 18B of the bolt is retained relative to the tightening tab 14, while the nut 19 is retained relative to the tightening tab 15. It can be understood that tightening the bolt or the nut tends to move the tightening tabs 14 and 15 closer together.

Throughout the description below, terms such as "outer", "outwards", etc. are used to specify an element of the collar that extends, projects, or faces towards the outside relative to the axis A of the collar. Similarly, the radial direction is defined as being the direction that extends radially relative to the axis A of the collar.

Figure 2:
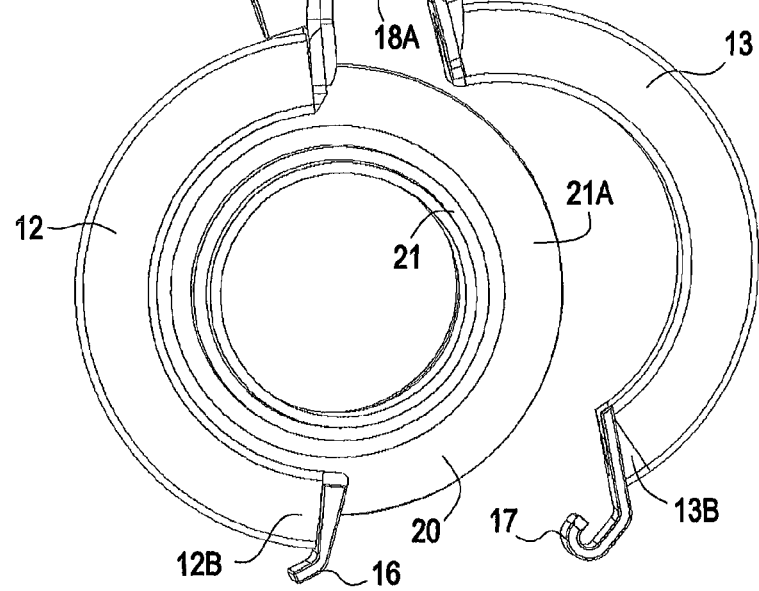
FIG. 2 shows the collar of FIG. 1 while it is being mounted around the article.

In FIGS. 2, 3, and 5, the collar is being mounted on the article that is to be clamped. The article is designated by reference 20 and, as can be understood in FIG. 5, it may, for example, be made up of two assembled-together tube portions 21 and 22, the facing ends of said tube portions having flares, respectively 21A and 22A.

In the example shown, the belt has a recessed section, in particular a V-shaped section, the tip of which faces radially outwards from the belt. It can be understood that the flares 21A and 22A come to be received in said recessed section, so that tightening the collar tends to press together the mutually facing ends of the tube portions 21 and 22, which ends co-operate with each other when said portions are assembled together.

Naturally, this is only one example of an application of the invention. The collar of the invention may also serve to clamp any type of article, in particular a pipe or hose fitted onto a tube. The collar may have a recessed section that is V-shaped as described above, or that is U-shaped, or else that is of flat section, or indeed, generally, that is of any section suitable for clamping the article that it is designed to clamp.

In FIGS. 2, 3, and 4, the belt portion 12 is disposed around a portion of the article 20 that the collar makes it possible to clamp, while the belt portion 13 is spaced apart from the article. The two belt portions can move apart from each other in order to define between them a space that is sufficient to enable the collar to be mounted around the article 20.

In order to finish mounting the collar starting from the situation shown in FIGS. 2, 3, and 5, the belt portion 13 is moved so that its second end 13B comes closer to the second end 12B of the belt portion 12, until the assembly members 16, 17 that equip the two end portions come to be assembled together.

In this situation, the collar is pre-mounted, i.e. it is situated around the article to be clamped in such a manner that it encircles said article, but without yet exerting any significant clamping force on said article. In order for the clamping forces to be obtained, the collar is tightened via the tightening means. Thus, starting from a pre-mounting situation, in which the second ends of the belt portions are assembled together, the bolt 18 of the collar shown by way of example in FIGS. 1 to 5 is tightened in such a manner as to move the tightening tabs 14 and 15 closer together, thereby causing the diameter of the belt to be reduced in the manner necessary for tightening the collar.

It can be seen that the first ends 12A and 13A of the belt portions 12 and 13 are interconnected by a bridge 24. When the collar is in the non-tightened state, as can be seen, for example, in FIG. 2, the bridge makes it possible to maintain a spacing between the tightening tabs 14 and 15, while also interconnecting them in such a manner that they are held relative to each other. The bridge 24 thus forms a hinge zone between the two belt portions making it possible to bring their respective second ends towards each other, in such a manner as to cause the assembly members to co-operate with each other. The bridge extends substantially in the peripheral direction of the belt, perpendicularly to the axis A of the collar.

While the collar is being tightened, the bridge changes configuration and, as can be seen in FIG. 1, it is deformed in such a manner as to form a U-shaped loop extending radially outwards, the base of the U being situated on the outside. Naturally, the bridge could deform in some other manner. What is important is that the bridge should be suitable for changing configuration under relatively insignificant forces, in such a manner as not to adversely affect the relative movement of the tightening tabs that is necessary for the collar to be tightened.

Thus, in the example shown in FIG. 1, the bridge 24 is flexible (i.e. it has flexibility considerably higher than the flexibility of the belt portions) and can thus be deformed under the effect of the tightening force. It is also possible for the bridge to be shaped in such a manner as to break under the effect of the movement of the lugs that takes place while the collar is being tightened. In a first stage, the bridge could deform, e.g. by forming a loop extending radially outwards, until it breaks, thereby leaving two arms, attached to respective ones of the two belt portions.

The bridge 24 is secured to or integral with the two belt portions, and, in the example shown, forms one piece therewith. In particular, the assembly made up of the belt portions, together with the tightening tabs and the bridge, and together with the assembly members may be formed in one piece from a blank, cut and subjected to stamping and/or folding operations and rolling-up operations in order to form the above-mentioned assembly.

In the above-mentioned examples, the bridge extends between the tightening tabs 14 and 15. In FIGS. 1 to 5, the bridge is connected to the radially outermost ends of the tightening tabs 14 and 15. It is formed by a strip portion that is narrower than the belt portions. In particular, as can be seen in FIG. 5, the belt portions and the tightening tabs are of width L considerably larger than the width l of the strip that forms the bridge 24, these widths being measured along the axis A of the collar. For example, this width l may be approximately in the range one fourth of the width L to one tenths of the width L.

In this example, the belt and the bridge are symmetrical about a plane P that is perpendicular to the axis A of the collar. The fact that the bridge 24 is thus centered on that plane makes it possible to facilitate aligning the two ends of the belt portions in said plane and to avoid any offsets relative to each other in the direction along the axis A of the collar.

It is possible, instead of having a single strip, to make provision for the bridge to be made up of a plurality of strips, and in particular by two strips that are substantially analogous to the strip 24 but that are optionally narrower, and preferably situated symmetrically about the plane P.

Figure 6:
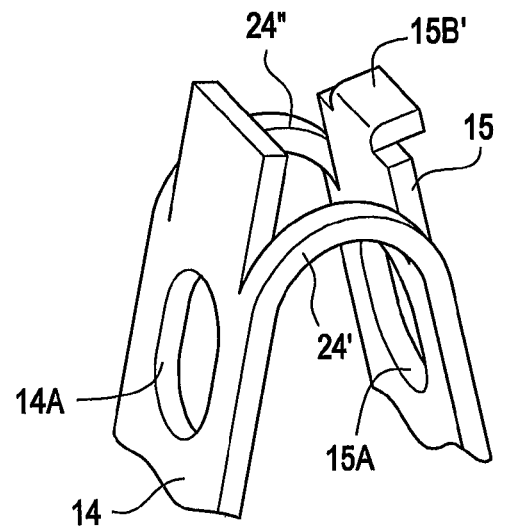
FIG. 6 is a diagrammatic perspective side view of a variant in which the bridge differs from the bridge of the preceding figures.

FIG. 6 diagrammatically shows a variant embodiment for the bridge. Therefore only the tightening tabs 14 and 15 are shown, with their holes 14A and 15A through which the shank of the bolt can pass. In this example, the bridge is made up of two strip portions 24' and 24", each of which extends between the two tightening tabs 14 and 15, while being connected to the sides of said tabs. The two strips are secured to or integral with the tightening tabs and, in this example, are formed in one piece with the two belt portions.

In the example shown in FIGS. 1 to 7, the tightening means comprise the bolt 18 and the nut 19. In this example, this nut is retained so that it is prevented from turning relative to the tightening tab 15.

Thus, in FIGS. 1 to 5, the tightening tab 15 has two side flange portions 15B and 15C that extend away from the tightening tab 14, and against which two opposite facets of the nut 19 come to be retained. These flange portions also serve to stiffen the tightening tab 15 and, furthermore, the tightening tab 14 is also provided with two side flange portions that serve to stiffen it.

As can be seen more clearly in FIG. 4, this nut 19 is provided with a projecting bushing 19A that passes through the hole 15A of the tightening tab 15. After the bushing has been inserted into the hole, the free edge of the bushing can be pushed back to form a radial rim 19B, thereby making it possible to retain the nut in place in said hole.

In view of the fact that, during the tightening, the belt portions and thus the tightening tabs move relative to one another, the nut 19 is a loose fit in the hole 15A. It can be seen that the diameter of the hole is greater than the outside diameter of the bushing 19. Since the clearance between the bolt and the tightening tabs that is necessary for enabling the belt portions to move extends mainly in the plane P, said hole may be oblong so that it is elongate in the same direction D as the height of the tab. In any event, provision is advantageously made for the hole 14A or 15A in at least one of the tightening tabs 14 and 15 to be oblong so as to provide such clearance.

Figure 7:
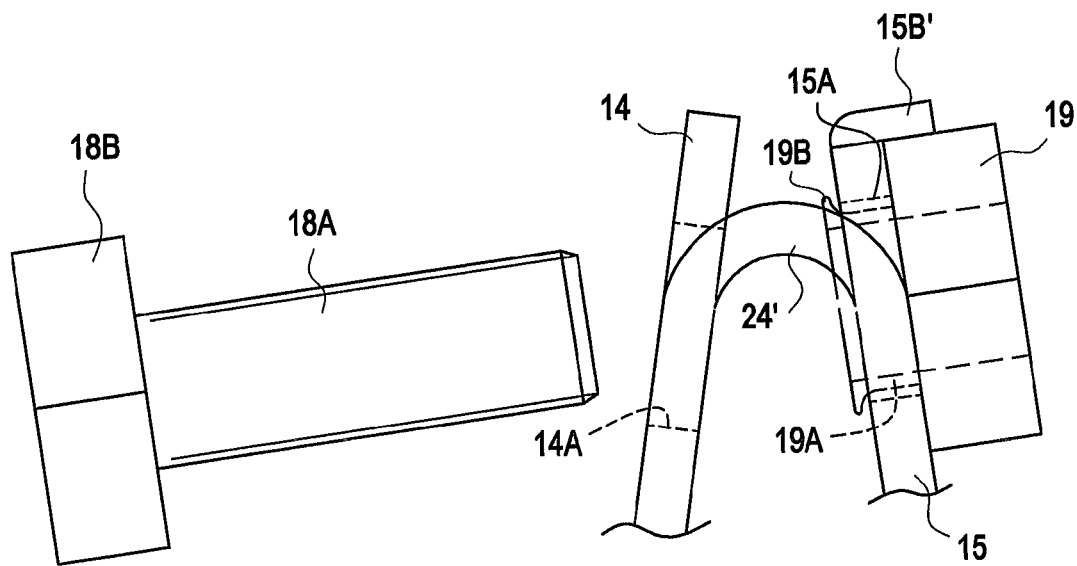
FIG. 7 is a side view of FIG. 6, seen looking along arrow VII of FIG. 6, showing, inter alia, the tightening means comprising a tightening bolt and a nut as shown in FIG. 4.

In the example shown in FIGS. 6 and 7, the hole 15A is also oblong. It can also be seen that the radially outermost end of the tightening tab 15 has an end flange 15B' that extends on the side of said tab 15 that faces away from the tab 14. As can be seen more clearly in FIG. 7, said end flange serves to retain the nut 19 so as to prevent it from turning, one of the facets of the nut being retained against the end flange.

In the example shown in FIGS. 1 to 6, the assembly members 16 and 17 co-operate with each other by hooking. It can be seen that the hooking member 17 is formed by a first lug that projects radially outwards at the end 13B of the belt portion 13, said first lug having a free end 17A that is curved back towards the inside so as to form a hook. The assembly member 16 of the end 12B of the belt portion 12 is provided with a second lug that projects radially outwards. It can be understood that this second lug comes to hook under the curved-back free end 17A of the lug 17. In this example, in order to facilitate the hooking, the second lug 16 and the curved-back portion of the first lug are inclined relative to the radial direction, in the direction going from the first lug 17 to the second lug 16.

Figure 8:
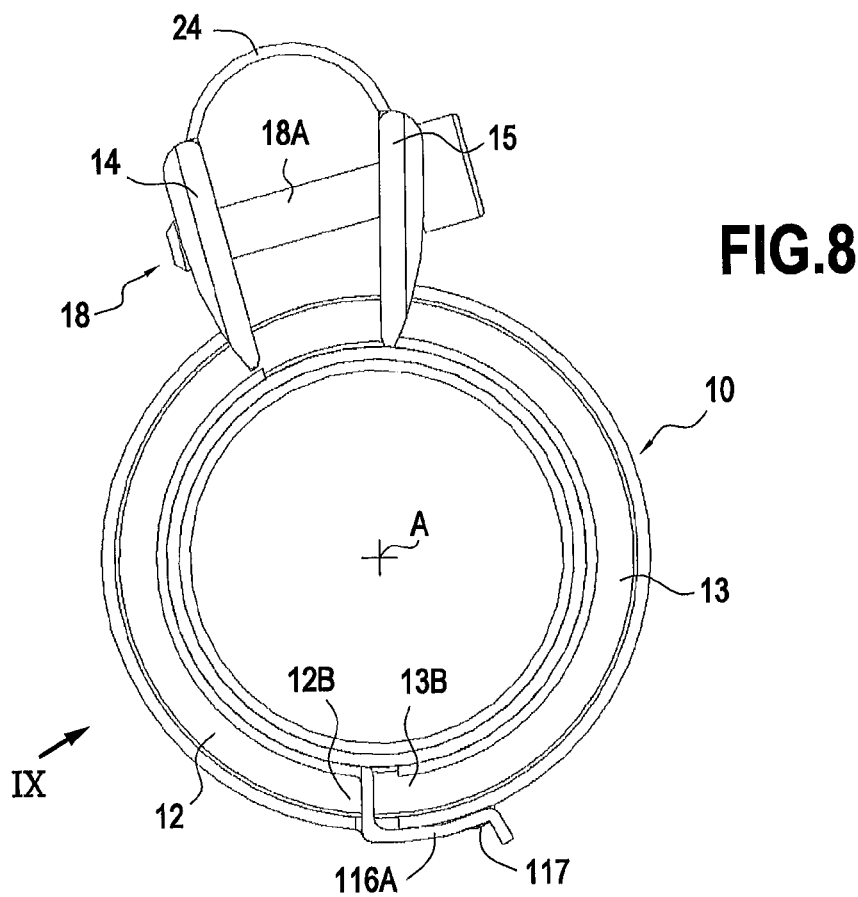
FIG. 8 is a side elevation view showing a second embodiment of a clamping collar, as mounted on an article that is to be clamped, while the collar is closed around the article, without being tightened.
Figure 9:
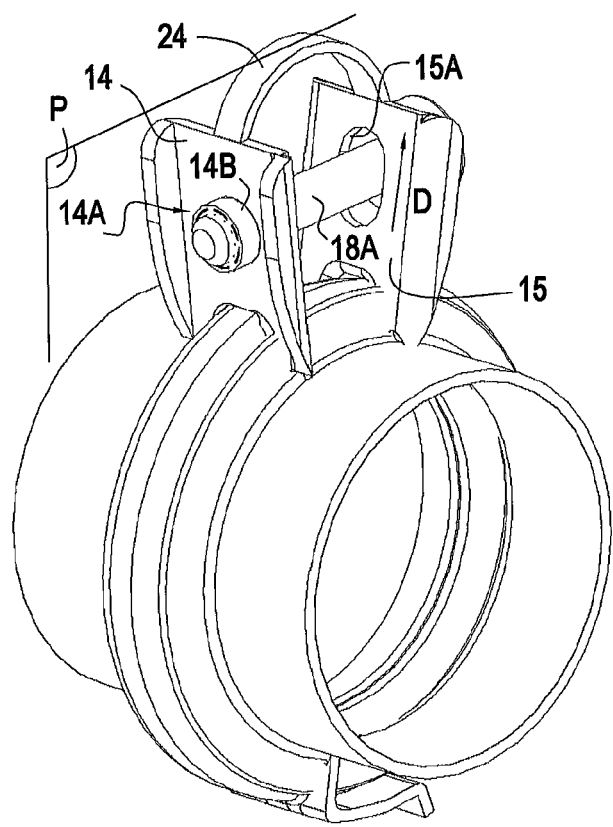
FIG. 9 is a perspective view, seen looking along arrow IX of FIG. 8.

FIGS. 8 to 12 are described below. With reference firstly to FIGS. 8 and 9, it can be seen that the collar that is shown has a structure analogous to the structure of the above-described collar, in particular in that it comprises a belt 10 with two belt portions 12 and 13, at the first ends of which tightening tabs 14 and 15 are upstanding, and at the second ends of which assembly members are provided, respectively 116 and 117.

In addition, the bridge 24 interconnects the tightening tabs 14 and 15. The tightening means comprise the bolt 18 having its shank 18A passing through the holes 14A and 15A in the tightening tabs 14 and 15.

A first difference between this collar and the above-described collar lies in the fact that the hole in one of the tightening tabs is provided with a tapped bushing for co-operating by screw-engagement with the shank 18A of the bolt. In this example, the tightening tab 14 is provided with such a projecting bushing 14B that is formed by pushing out the material of the edge of the hole 14A and that is threaded so as to co-operate by screw-engagement with the shank of the bolt. It is not necessary to use a separate nut. In this example, the bushing 14B extends in the form of a cylindrical element on the side of the tightening tab 14 that faces away from the tightening tab 15. Thus, the shank of the bolt fits snugly into the hole 14A. Conversely, the shank of the bolt is a loose fit in the hole 15A in the tightening tab 15. It can be seen that said hole 15A is oblong and has diametrical dimensions that are greater in the same direction D as the height of the tightening tab 15, which direction corresponds substantially to the radial direction relative to the axis A of the collar, in such a manner as to provide clearance within which the shank of the bolt can move inside said hole, while holding said shank substantially in the midplane P of the collar that is perpendicular to the axis A.

Figure 10:
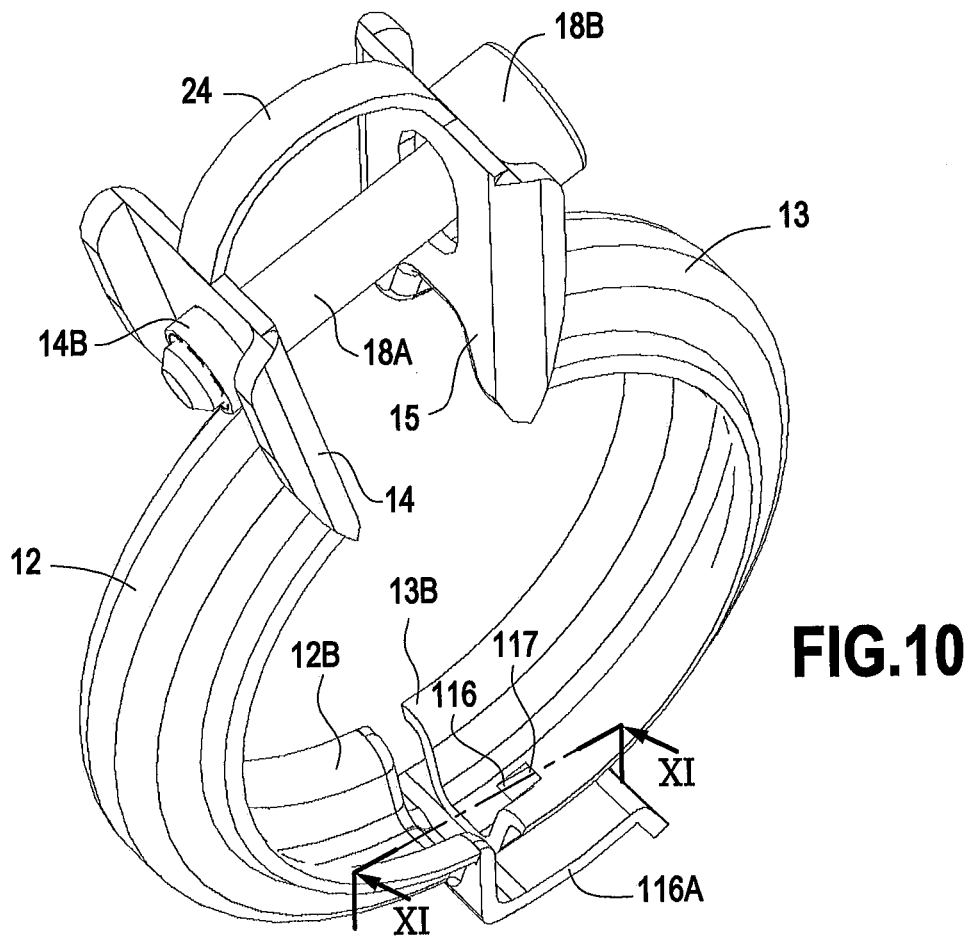
FIG. 10 is a perspective view showing the collar of FIGS. 8 and 9.

It can also be seen that, like the tightening tabs 14 and 15 of the embodiment in the preceding figures, the tightening tabs of the embodiment in FIGS. 8 to 10 are provided with reinforcing side flanges. In this example, said side flanges on each tab extend in the opposite direction from the direction in which the side flanges extend on the other tab.

Another difference between this collar and the collar in the preceding embodiment lies in the shape of the assembly members. The assembly member 116 of the second end 12B of the belt portion 12 is formed on an extension 116A of said second end that is offset radially outwards.

Figure 11:
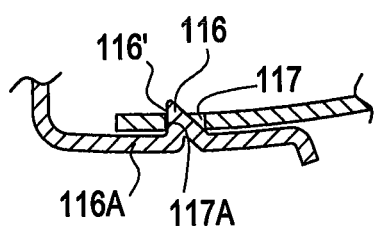
FIGS. 11 and 12 are views in section on the plane XI-XI of FIG. 10, showing two variants for the assembly members of the collar of FIGS. 8 to 10.

For example, as can be seen in FIG. 11, this assembly member 116 may be formed by a projection projecting from the inside of the extension 116A, in order to form a hooking piece in relief. In a variant, as shown in FIG. 12, the hooking member 116 may be formed by a cutout in the extension 116A.

Figure 12:
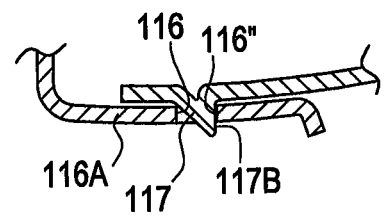

In any event, the hooking member has a hooking inside edge, be it the face 116' of the projection 116 shown in FIG. 11, or indeed the edge 116" of the cutout hooking member 116, as shown in FIG. 12.

The assembly member of the second end 13B of the belt portion 13 has a hooking edge 117 that hooks onto said hooking inside edge. In the example shown in FIG. 11, the hooking member of the end 13B of the belt portion 13 is formed by an opening 117 in said second end, and its hooking edge 117A is formed by one of the edges of said opening. In the example shown in FIG. 12, the hooking member 117 is formed by a radial protrusion of a projection extending outwards on the second end 13B of the belt portion 13, an edge in relief 117B of the hooking member hooking against the edge 116" of the window 116. As noted above, in place of the projections 116 in FIG. 11 or 117 in FIG. 12, it is possible to provide punched-out portions or upstanding tabs, respectively extending inwards and outwards.

In the above-described examples, the collar is tightened by bringing the tightening tabs closer together, and the belt forms an assembly wrapped around through slightly less than 360°. In a variant, it is possible to design the belt to extend through more than 360°, e.g. so as to form a collar of the type shown in FIG. 13 in which the tightening takes place by moving the tightening tabs apart, in which case the bridge may initially form a loop that flattens out or that breaks during the tightening.

Figure 13:
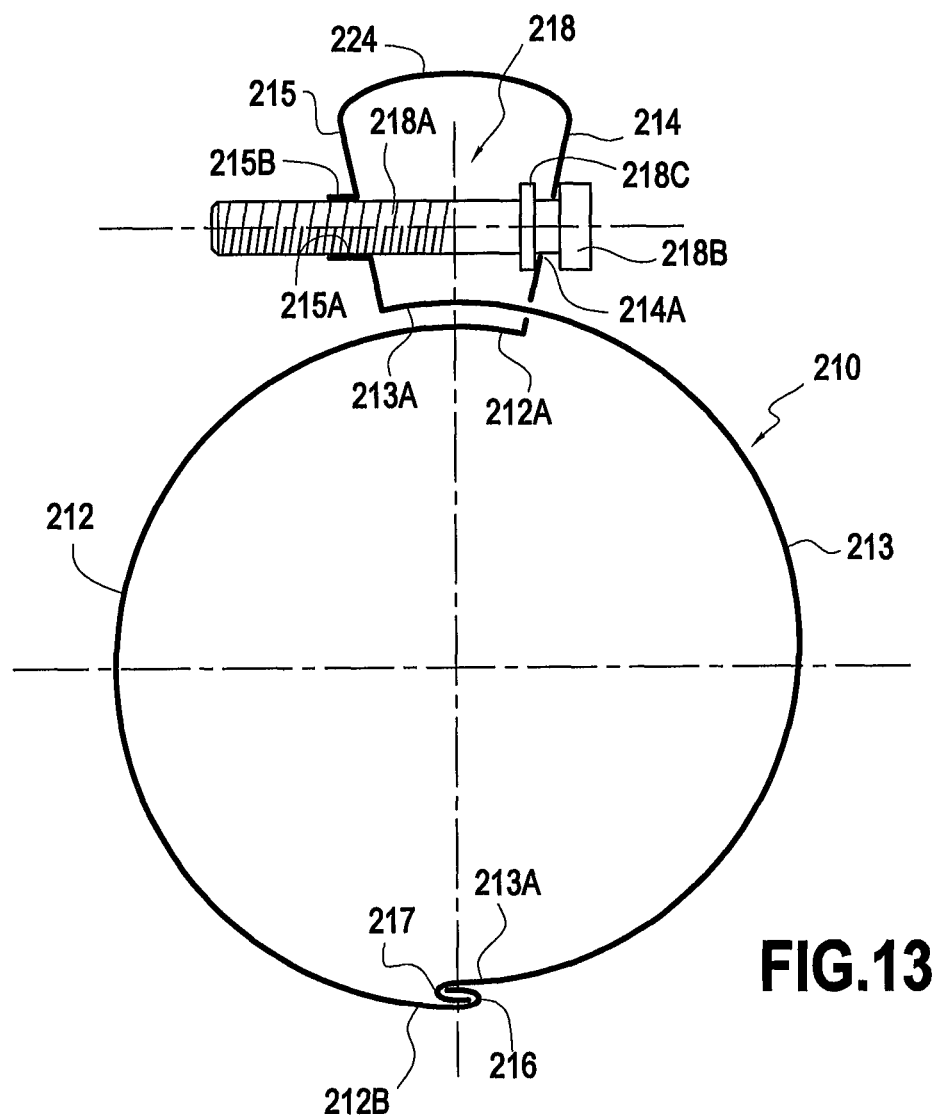
FIG. 13 is a diagrammatic side elevation view, showing another embodiment of a collar of the invention.

Thus, in FIG. 13, the belt 210 comprises two belt portions, respectively 212 and 213 which, considered together, wrap around through more than 360° when the collar is closed. At their first ends, respectively 212A and 213A, these belt portions have tightening tabs, respectively 214 and 215 that are upstanding outwardly and substantially radially. A bridge 224 interconnects the first ends of the belt portions 212 and 213. In this example, as in the above-described examples, the bridge 224 extends at the radially outermost ends of the tightening tabs 214 and 215. At their respective second ends, respectively 213B and 212B, the belt portions have assembly members that, in this example, are constituted by hooks, respectively 216 and 217, that are curved back in such a manner as to hook together.

In this example, the tightening means comprise a bolt 218, the shank 218A of which passes through the holes, respectively 214A and 215A in the tightening tabs 214 and 215. Once the assembly members are assembled together, by hooking in this example, the collar can be tightened by turning the bolt 218. In this example, this turning takes place in the loosening direction because the tightening obtained by reducing the diameter of the collar requires the tightening tabs 214 and 215 to be moved further apart.

In this example, the head of the bolt 218B is retained relative to the tightening tab 214 while also being able to turn relative thereto. For this purpose, on the side of this tab that is further from the head, the bolt carries a radial bead 218C, e.g. made in the form of a circlip mounted on the shank of the bolt after it has been engaged in the hole 214A. On the same side as the tightening tab 215, the shank of the bolt co-operates with a thread. It could be a separate nut, but, in this example, this thread is formed in a projecting bushing 215B forming a cylindrical extension of the edge of the hole 215A. It can be understood that, when the bolt is turned in the loosening direction, its head remains retained relative to the tightening tab 214, while its shank loosens relative to the thread of the bushing 215B, thereby tending to move the tightening tab 215 and the tightening tab 214 apart.

Naturally, FIG. 13 is given merely by way of indication of a possible embodiment. In particular, it is possible to make provision for the assembly means 216 and 217 to be modified in a manner similar to the assembly means described with reference to the preceding figures.

Figure 14:
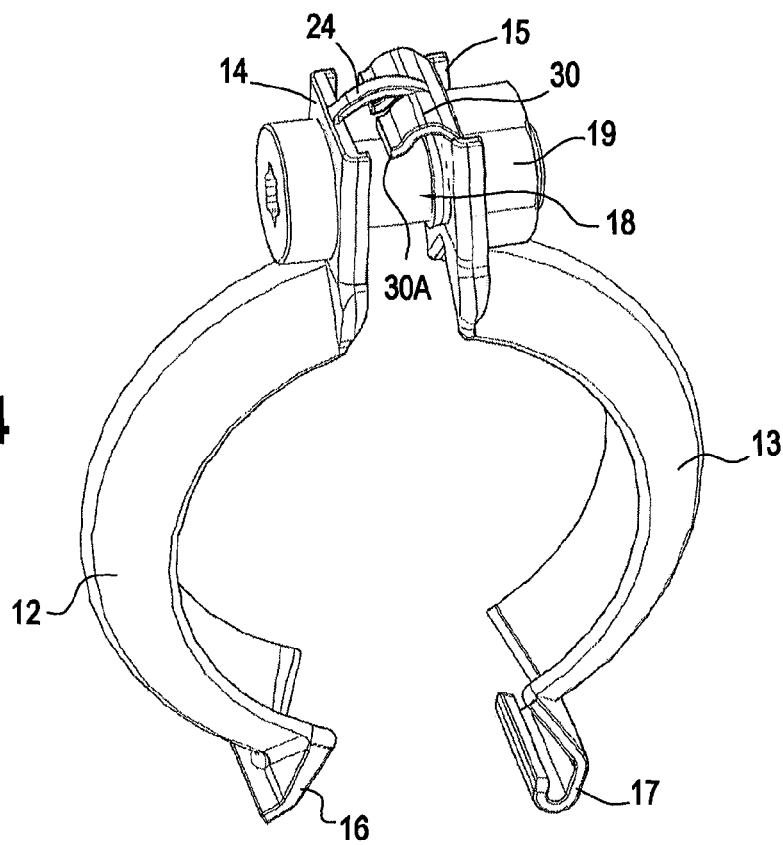
FIG. 14 is a perspective view, seen from above and from the side, showing a variant embodiment for the collar of FIGS. 1 to 5, in the free, non-tightened state.
Figure 15:
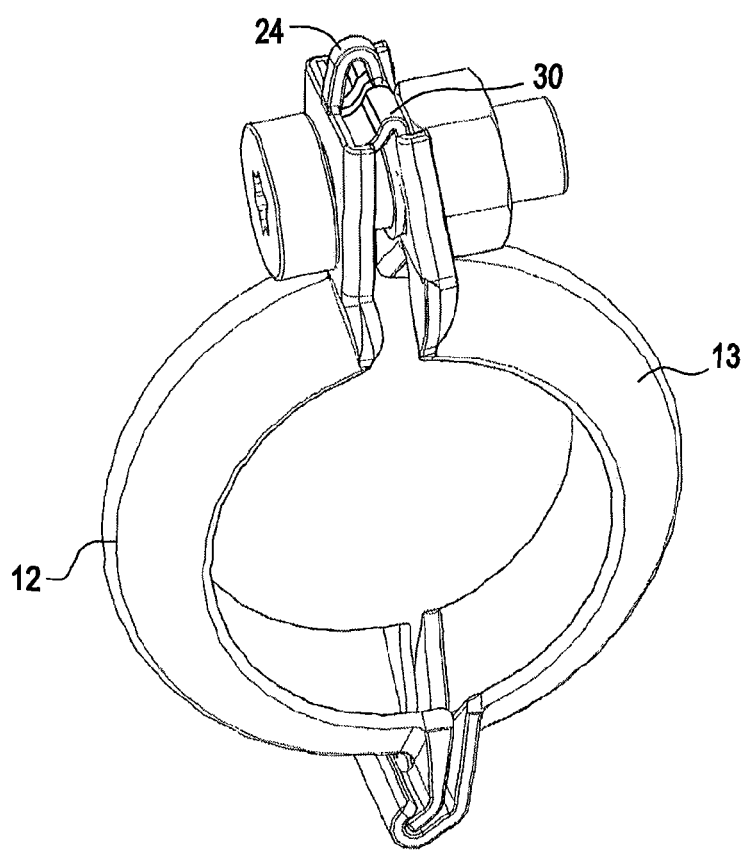
FIG. 15 is a perspective view analogous to the FIG. 14 view, showing the FIG. 14 collar in the tightened state.

There follows a description of FIGS. 14 and 15 that show a variant embodiment of FIGS. 1 to 5. In this example, the collar is entirely similar to the collar described with reference to FIGS. 1 to 5, except that it is equipped with an abutment defining minimum spacing for the tightening tabs when the collar is in the tightened position. In this example, this abutment is formed by a folded-over portion 30 provided at the radially outermost end of the tightening tab 15 and extending towards the tightening tab 14.

FIG. 14 shows this collar in the open state, while the folded-over portion 30 is in the free state. FIG. 15 shows the same collar in the closed state, and it can be seen that the free end 30A of the folded-over portion 30 has come into abutment against the inside face of the tightening tab 14 (i.e. the face of said tightening tab that faces towards the tightening tab 15). It can also be understood that the abutment 30 is deformable because it can be seen that it has flattened in the peripheral direction during the tightening of the collar. It constitutes a form of spring that, once deformed, maintains a minimum spacing between the tightening tabs 14 and 15. In addition, this abutment may serve as an end-of-tightening indicator because, once its free end 30A has come into contact against the inside face of the tightening tab 14, the stresses it exerts on said tabs make it necessary for higher tightening torque to be applied.

The collar of FIGS. 14 and 15 also has the bridge 24 that, like the bridge in FIGS. 3 to 5, is formed at the radially outermost ends of the tightening tabs. Thus, the folded-over portion that forms the abutment 30 may be made up of two tongues extending on either side of the bridge 24 starting from the radially outermost end of the tightening tab 15. It can be seen that the abutment 30 is in the shape of a corrugation, the abutment free end of which is brought back into a substantially circumferential direction of the collar. This corrugation determines the direction of deformation of the abutment at the end of tightening. Similarly, the bridge 24 is initially undulated in the desired direction, which predetermines the direction of deformation of said bridge.

It is indicated above that the bridge may be breakable. If it is desired to facilitate this possibility, it is possible to equip the bridge with a line of weakness 24A (see FIG. 3) determining the zone in which it is broken at the end of tightening. This zone of weakness may also embody the hinge axis of the hinge zone that the bridge forms.

FIG. 16 is described below. In this variant embodiment, the bridge 324 is secured to or integral with the first end 12A of the belt portion 12. More precisely, this bridge is secured to or integral with the first tightening tab 14. It may be in one piece with the first belt portion 12 or else be separate and mounted on the first tab. On the side facing away from the tightening tab 14, the bridge 324 has a fastening tab 325 in which a hole 325A is provided. Thus, the two belt portions 12 and 13 are assembled together by putting the hole 325A in said tab 325 into register with the hole 15A in the tightening tab 15 of the second belt portion 13. It then suffices to insert the shank 18A of the bolt 18 through the hole 14A in the tab 14, and through the holes 325A and 15A that are in register with each other. In the example shown, the tightening tab 15 is secured to or integral with a threaded projecting bushing 315B. In this example, this bushing projects from the inside of the tab 15, between its side flanges. The diameter of the bore 325A is adapted to match the outside diameter of said bushing, so that said bushing is inserted into the bore 325A when the holes 325A and 15A are put into register with each other. In this example, the bridge 324 forms a V-shape, the tip 324A of the V-shape pointing towards the inside of the collar. This tip 324A thus forms a fold that extends parallel to the axis of the collar and that embodies the axis of the hinge that is formed by the bridge 24. Once the holes 325A and 15A have been put in register with each other, and once the bolt 18 has been put in place in the holes 14A, 325A, and 15A, the bolt may be merely pre-screwed into the bushing 15B. The collar can then be put in place around the article to be clamped, and the second ends of the belt portions 12B and 13B can be hooked together via their hooking means 16 and 17.

As shown in FIG. 17, the bridge 324' is an element distinct from the belt portions 12 and 13. It is provided firstly with a tab 325' analogous to the tab 325 described with reference to FIG. 16, and, like that tab, provided with a hole 325'A. For fastening it to the tightening tab 14, the bridge 324' has, firstly a fastening tab 325", provided with a hole 325"A. In order to assemble the collar, the bridge is disposed in such a manner that the holes 325'A and 325"A come respectively into register with the holes 14A and 15A in the tightening tabs 14 and 15. The bolt is then inserted into said holes. As in the preceding example, the hole 15A in the tightening tab 15 may be equipped with a projecting bushing. The hole 14A in the tab 14 is advantageously oval, as is the hole 325"A in the tab 325". The second ends 12B and 13B of the belt portions 12 and 13 are provided with above-described assembly means 16 and 17 that operate by hooking.

In FIGS. 16 and 17, the fastening tabs 325, 325' and 325" point in directions such that they are parallel to the tightening tabs 14 and 15 when the bridge is assembled with the belt portions. In addition, in the example shown, the fastening tabs for fastening the bridge are disposed on the insides of the tightening tabs 14 and 15. It is naturally possible to make provision to dispose them on the outsides, but disposing them on the insides is preferable. The bridges 324 and 324' are provided with slots, respectively 324A and 324'A, that extend longitudinally, i.e. in the direction going from one tightening tab to the other. As can be seen more clearly in FIG. 18, each of these slots extends at least in the base of the V-shape that is formed by the bridge so that, when said bridge folds under the effect of the collar being tightened, the bolt 18 does not obstruct said deformation of the bridge.

The invention claimed is:

1. A clamping collar comprising a belt made up of two belt portions, each of which has a first end provided with a tightening tab and a second end provided with an assembly member, the assembly members being suitable for co-operating with each other so as to assemble said second ends together in releasable manner, the tightening tabs being able to be moved relative to each other once the second ends are assembled together, in such a manner as to tighten the collar, the collar further comprising a nut/bolt arrangement and the first ends of the two belt portions being interconnected by the nut/bolt arrangement and further interconnected via a bridge so that, when the collar is in a free, non-tightened state, the bridge holds together the tightening tabs relative to each other and makes it possible for the second ends of the belt portions to be brought closer together until the assembly members co-operate with each other, the configuration of said bridge being modified while the collar is being tightened so as to enable the tightening tabs to move relative to each other, wherein the bridge is integral with the first end of each of the two belt portions and wherein the two belt portions and the bridge are formed in one piece.

2. The clamping collar according to claim 1, wherein the bridge is secured to or integral with the first end of at least one of the two belt portions.

3. The clamping collar according to claim 1, wherein the bridge extends between the tightening tabs.

4. The clamping collar according to claim 1, wherein the bridge is suitable for being deformed under the effect of the tightening force during tightening.

5. The clamping collar according to claim 1, wherein the bridge forms a hinge zone between the two belt portions.

6. The clamping collar according to claim 1, wherein the bridge is suitable for breaking under the effect of the tightening tabs moving while the collar is being tightened.

7. The clamping collar according to claim 1, wherein the bridge is formed by at least one strip portion that is narrower than the belt portions.

8. The clamping collar according to claim 1, wherein each of the tightening tabs is provided with a hole, and the collar comprises a bolt having a shank which passes through said holes, said bolt being retained relative to the tabs so as to cause them to move relative to each other by screw-engagement.

9. The clamping collar according to claim 8, wherein the hole in at least one of the tightening tabs is oblong.

10. The clamping collar according to claim 8, wherein the hole in one of the tightening tabs has a tapped projecting bushing for co-operating by screw-engagement with the shank of the bolt.

11. The clamping collar according to claim 1, wherein the assembly members co-operate with each other by hooking.

12. The clamping collar according to claim 11, wherein the assembly member of the second end of one of the belt portions comprises a first lug projecting radially outwards and having a free end curved back inwards to form a hook, while the assembly member of the second end of the other belt portion comprises a second lug projecting radially outwards and that is suitable for co-operating with said hook.

13. The clamping collar according to claim 11, wherein the assembly member of the second end of one of the belt portions is formed on an extension of said second end that is offset radially outwards.

14. The clamping collar according to claim 13, wherein the extension has a hooking inside edge, and the assembly member of the second end of the other belt portion comprises a hooking edge suitable for hooking onto the hooking inside edge, on the inside of the extension.

15. The clamping collar according to claim 1 provided with an abutment between the tightening tabs defining a minimum spacing between said tabs when the collar is in the tightened state.

16. The clamping collar according to claim 1, wherein, in the non-tightened state, the bridge holds the tightening tabs relative to each other and makes it possible for the second ends of the belt portions to be brought closer together until the assembly members co-operate with each other, while a tightening bolt is in place relative to the tightening tabs.

17. A clamping collar comprising a belt made up of two belt portions, each of which has a first end provided with a tightening tab and a second end, the second end being able to co-operate with each other by hooking so as to be assembled together in a releasable manner, the tightening tabs being able to be moved relative to each other once the second ends are assembled together, in such a manner as to tighten the collar, the collar further comprising a nut/bolt arrangement and the first ends of the two belt portions being interconnected by the nut/bolt arrangement and further interconnected via a bridge so that, when the collar is in a free, non-tightened state, the bridge holds together the tightening tabs relative to each other and makes it possible for the second ends of the belt portions to be brought together until the second ends of the belt portions are hooked together, the configuration of said bridge being modified while the collar is being tightened so as to enable the tightening tabs to move relative to each other, wherein the bridge is integral with the first end of each of the two belt portions and wherein the two belt portions and the bridge are formed in one piece.

18. The clamping collar according to claim 17, wherein, in the non-tightened state, the bridge holds the tightening tabs relative to each other and makes it possible for the second ends of the belt portions to be brought closer together until the second ends are hooked together, while a tightening bolt is in place relative to the tightening tabs.

19. A clamping collar comprising a belt made up of two belt portions, each of which has a first end provided with a tightening tab and a second end provided with an assembly member, the assembly members being suitable for co-operating with each other so as to assemble said second ends together in releasable manner, the tightening tabs being able to be moved relative to each other once the second ends are assembled together, in such a manner as to tighten the collar, the collar further comprising a nut/bolt arrangement and the first ends of the two belt portions being interconnected by the nut/bolt arrangement and further interconnected via a bridge so that, when the collar is in a free, non-tightened state, the bridge holds together the tightening tabs relative to each other and makes it possible for the second ends of the belt portions to be brought closer together until the assembly members co-operate with each other, the configuration of said bridge being modified while the collar is being tightened so as to enable the tightening tabs to move relative to each other, wherein the bridge is secured to the first end of a first one of the two belt portions and is integral with the first end of a second one of the two belt portions and wherein the two belt portions and the bridge are formed in one piece.

20. The clamping collar according to claim 19, wherein the bridge is secured to the first end of the first one of the two belt portions via a tightening bolt which serves to move the tabs relative to each other for tightening the collar.

21. A clamping collar comprising a belt made up of two belt portions, each of which has a first end provided with a tightening tab and a second end, the second end being able to co-operate with each other by hooking so as to be assembled together in a releasable manner, the tightening tabs being able to be moved relative to each other once the second ends are assembled together, in such a manner as to tighten the collar, the collar further comprising a nut/bolt arrangement and the first ends of the two belt portions being interconnected by the nut/bolt arrangement and further interconnected via a bridge so that, when the collar is in a free, non-tightened state, the bridge holds together the tightening tabs relative to each other and makes it possible for the second ends of the belt portions to be brought together until the second ends of the belt portions are hooked together, the configuration of said bridge being modified while the collar is being tightened so as to enable the tightening tabs to move relative to each other, the configuration of said bridge being modified while the collar is being tightened so as to enable the tightening tabs to move relative to each other, wherein the bridge is secured to the first end of a first one of the two belt portions and is integral with the first end of a second one of the two belt portions and wherein the two belt portions and the bridge are formed in one piece.

22. The clamping collar according to claim 21, wherein the bridge is secured to the first end of the first one of the two belt portions via a tightening bolt which serves to move the tabs relative to each other for tightening the collar.

* * * * *